(12) United States Patent
Sutoh et al.

(10) Patent No.: US 8,756,199 B2
(45) Date of Patent: Jun. 17, 2014

(54) FILE LEVEL HIERARCHICAL STORAGE MANAGEMENT SYSTEM, METHOD, AND APPARATUS

(75) Inventors: Atsushi Sutoh, Yokohama (JP); Masanori Takata, Yokohama (JP); Hitoshi Kamei, Sagamihara (JP); Nobumitsu Takaoka, Sagamihara (JP); Takahiro Nakano, Yokohama (JP); Akio Shimada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 12/678,235

(22) PCT Filed: Mar. 1, 2010

(86) PCT No.: PCT/JP2010/001365
§ 371 (c)(1),
(2), (4) Date: Mar. 15, 2010

(87) PCT Pub. No.: WO2011/108021
PCT Pub. Date: Sep. 9, 2011

(65) Prior Publication Data
US 2011/0231458 A1    Sep. 22, 2011

(51) Int. Cl.
*G06F 7/02* (2006.01)
*G06F 17/30* (2006.01)

(52) U.S. Cl.
USPC ............ 707/646; 707/651; 707/827; 707/829

(58) Field of Classification Search
USPC ........ 707/999.2, 999.204, 999.205, 827, 651, 707/610, 999.002, 646, 653, 661, 829; 711/161, 162, 100
See application file for complete search history.

(56) References Cited

U.S. PATENT DOCUMENTS

| | | | |
|---|---|---|---|
| 7,356,660 B2 | 4/2008 | Matsunami et al. | |
| 7,441,096 B2 * | 10/2008 | Kitamura | ................ 711/203 |
| 2004/0193760 A1 | 9/2004 | Matsunami et al. | |
| 2006/0288048 A1 | 12/2006 | Kamohara et al. | |
| 2007/0192360 A1 | 8/2007 | Prahlad et al. | |
| 2007/0204119 A1 * | 8/2007 | Murotani et al. | ............. 711/161 |
| 2009/0177836 A1 | 7/2009 | Mimatsu | |

FOREIGN PATENT DOCUMENTS

| | | |
|---|---|---|
| CN | 1570842 A | 1/2005 |
| JP | 2006-350599 A | 12/2006 |
| JP | 4409521 B2 | 11/2009 |
| WO | 2006/039689 A2 | 4/2006 |

OTHER PUBLICATIONS

U.S. Appl. No. 12/490,053, first named inventor: Masanori Takata, filed Jun. 23, 2009.

(Continued)

*Primary Examiner* — Bruce Moser
(74) *Attorney, Agent, or Firm* — Mattingly & Malur, PC

(57) ABSTRACT

Time required for a file server to determine files to be migrated from a first storage region to a second storage region is reduced. A file service system coupled to the storage system for providing a first storage region and a second storage region stores identifiers of files that have been accessed by a client, in accessed file identifier information and determines the files to be migrated from the first storage region to the second storage region based on metadata of the files stored in the first storage region and the accessed file identifier information.

16 Claims, 17 Drawing Sheets

(56) References Cited

OTHER PUBLICATIONS

U.S. Appl. No. 12/642,559, first named inventor: Masanori Takata, filed Dec. 18, 2009.
John Kohl, et al., Highlight: A File System for Tertiary Storage, Twelfth IEEE Symposium on Mass Storage Systems, Apr. 26, 1993, pp. 157-161, IEEE, Los Alamitos, CA, USA.
Sandeep K. Sinha et al., Online Hierarchical Storage Manager, Jul. 13, 2009, pp. 263-274, Montreal, Quebec, CA.
Japanese Office Action received in Japanese Application No. 2012-517939 dated Sep. 10, 2013.
Chinese Office Action received in Chinese Application No. 2010800527448 dated Dec. 20, 2013.

* cited by examiner

FIG.4

| | | 214 |
|---|---|---|
| | MIGRATION POLICY 1 | |
| 411 — DIRECTORY | /mnt/fs1 | |
| 412 — CONDITION | ctime before one month ago | |
| 413 — CONDITION | extension is pdf | |
| 414 — SCHEDULE | Weekly (on Saturday) | |
| | MIGRATION POLICY 2 | |
| 421 — DIRECTORY | /mnt/fs2 | |
| 422 — CONDITION | atime before one week ago | |
| 423 — CONDITION | Size grater than 10MB | |
| 424 — SCHEDULE | Monthly (on 1st) | |

| PATH NAME | EVENT |
|---|---|
| /mnt/fs1/* | ctime modified |
| /mnt/fs1/* | file created |
| /mnt/fs2/* | file extension is ".pdf" |
| /mnt/fs3/* | atime modified |

FIG.6

| FILE PATH |
|---|
| /mnt/fs1/file_name_A.txt |
| /mnt/fs1/file_name_B.txt |
| /mnt/fs2/file_name_C.doc |
| /mnt/fs3/file_name_D.pdf | ns
FILE LEVEL HIERARCHICAL STORAGE MANAGEMENT SYSTEM, METHOD, AND APPARATUS

TECHNICAL FIELD

This invention relates to a file service provision apparatus, system, and method for storing files using storage regions of different characteristics.

BACKGROUND ART

An apparatus called a NAS (Network Attached Storage) or a file server is generally used in order to store files for multiple client computers (hereinafter simply referred to as the "clients"). The file server stores files created by the clients by reading data from or writing data to a storage system which can be accessed in units of blocks.

Furthermore, recently, while the necessity to store a considerable amount of files is growing, there is a demand for the reduction of a unit price per storage capacity. Patent Literature 1 discloses a technology of migrating files that are stored in a high-speed storage apparatus and have not been accessed for a certain amount of time, to a low-speed storage apparatus without changing a method of access from clients where the high-speed storage apparatus and the low-speed storage apparatus are coupled to a controller capable of processing file-level read and write (which corresponds to the above-mentioned file server). This technology is hereinafter referred to as the "file level hierarchical storage management technology."

CITATION LIST

Patent Literature

[PTL 1]
Japanese Patent No. 4409521

SUMMARY OF INVENTION

Technical Problem

Regarding the technique disclosed in Patent Literature 1, it is necessary to refer to update dates and times or reference dates and times for all the files managed by the controller in order to select files to be migrated. Therefore, if the file server manages a considerable amount of files, it takes a long time to select the files to be migrated.

It is an object of this invention to shorten the time for determining files to be migrated.

Solution to Problem

A file service system coupled to a storage system for providing a first storage region and a second storage region according to this invention stores an identifier of a file that has been accessed by a client, in accessed file identifier information and determines the file(s) to be migrated from the first storage region to the second storage region based on metadata of the files stored in the first storage region and the accessed file identifier information.

Advantageous Effects of Invention

According to this invention, it is possible to shorten the time for determining the file(s) to be migrated by a file server or a computer coupled to the file server, which uses the file level hierarchical storage management technology.

BRIEF DESCRIPTION OF DRAWINGS

FIG. 1 is a block diagram of a system for implementing the first embodiment of this invention.
FIG. 2 is a block diagram showing the hardware configuration of a file server according to the first embodiment of this invention.
FIG. 3 is a block diagram showing programs and information stored in a memory for the file server according to the first embodiment of this invention.
[FIG. 4]
FIG. 4 is a diagram showing an example of a file migration policy that is set according to the first embodiment of this invention.
[FIG. 5]
FIG. 5 is a diagram showing an example of a file update event setting according to the first embodiment of this invention.
[FIG. 6]
FIG. 6 is a diagram showing an example of a partial file list output by a program according to the first embodiment of this invention.
FIG. 7 is a diagram showing the concept of a file referred to according to the first embodiment of this invention.
FIG. 8 is a processing flow diagram illustrating processing executed by a management program for making file migration settings according to the first embodiment of this invention.
FIG. 9 is a processing flow diagram illustrating processing executed by a file migration program for migrating files according to the first embodiment of this invention.
FIG. 10 is a processing flow diagram illustrating processing executed by a program for setting a file system event notice according to the first embodiment of this invention.
FIG. 11 is a processing flow diagram illustrating processing executed by a file access and file system event notice program according to the first embodiment of this invention.
FIG. 12 is a processing flow diagram illustrating processing executed by a partial file list creation program according to the first embodiment of this invention.
FIG. 13 is a processing flow diagram illustrating processing executed by a file crawling program according to the first embodiment of this invention.
FIG. 14 is a diagram showing a setting screen example of the management program for making file migration settings according to the first embodiment of this invention.
FIG. 15 is a first schematic diagram showing the overview of this invention.
FIG. 16 is a second schematic diagram showing the overview of this invention.

FIG. 17 is a third schematic diagram showing the overview of this invention.
FIG. 18 is a diagram showing the second embodiment of this invention.

DESCRIPTION OF EMBODIMENTS

The details of an embodiment of this invention will be described below with reference to the attached drawings.

Note that, in the description below, information relating to this invention will be described with expressions such as an "aaa table," an "aaa list," an "aaa DB," and an "aaa queue," but these types of information do not necessarily have to be expressed with the data structures such as a table, a list, a DB, or a queue. Therefore, the expressions such as the "aaa table," "aaa list," "aaa DB," and "aaa queue" may sometimes be referred to as "aaa information" In order to show that the above-mentioned information does not depend on the data structures.

Furthermore, the description of the contents of each type of information uses the expressions such as "identification information," an "identifier," a "name," a "name," and an "ID" are used to explain the content of each piece of information, and these expressions can be substituted for one another.

A "program" may be used as a subject in the description below. However, since the program performs specified processing by being executed by a processor, using a memory and a communication port (communication control device), the processor may also be used as a subject in the description below. Furthermore, the processing disclosed with the program as a subject may also be processing executed by a computer such as a management server or an information processing unit. Furthermore, part of or the entire program may also be implemented by dedicated hardware.

Furthermore, various programs may also be installed by a program distribution server or storage media.

First Embodiment

Figure 1:
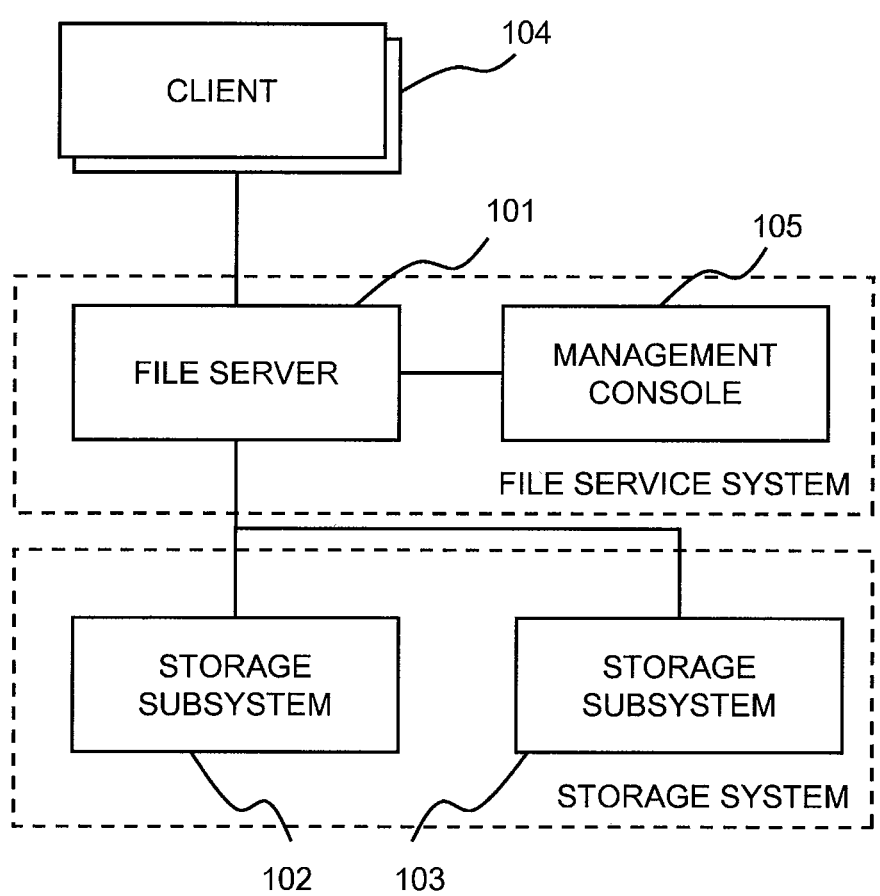
[FIG. 1]

FIG. 1 is a diagram of the hardware configuration of a computer system for implementing this invention.

A file server 101 provides a file access service to a client 104. The file access service enables storage and reading of data in files according to a protocol such as NFS (Network File System) or CIFS (Common Internet File Service). The file server 101 and the client 104 are coupled via a network interface such as the Ethernet. The client 104 is a PC or a server, and a plurality of clients may exist. Note that regarding the connection configuration between the client 104 and the file server 101, FIG. 1 shows direct connection as an example, but the connection configuration in which the client 104 and the file server 101 are coupled to each other via a network device such as a switch or a router may also be used.

The file server 101 stores data in a storage subsystem 102 and a storage subsystem 103. The file server 101 communicates with the storage subsystem 102 and the storage subsystem 103 according to a storage protocol of a block access type such as SCSI, FC, and others. Incidentally, FIG. 1 shows an example of direct connection between the file server 101 and the storage subsystems 102, 103, but they may be connected to each other via a network device such as a switch or a router.

Each of the storage subsystem 102 and the storage subsystem 103 has an interface for the connection with the file server 101, and also has a disk device, a tape device or the like for storing data. Alternatively, this computer system may be configured so that the storage subsystem 102 and the storage subsystem 103 provide a file access service and the file server 101 as a client accesses the storage subsystems 102 and 103. Note that, in this invention, a plurality of storage subsystems do not necessarily have to exist as devices; and one device may be enough if it can provide a plurality of storage regions of different characteristics. Therefore, in the description below, one or more devices which provide a first storage region and a second storage region which have different characteristics may sometimes be collectively referred to as the "storage system."

The hierarchical storage management realized by the file server 101 migrates a file between the storage subsystem 102 and the storage subsystem 103. Note that the file server 101 may be constituted from a plurality of computers.

A management console 105 is a computer that makes settings of a file access service provided by the file server 101 and settings of the hierarchical storage management provided by the file server 101, that is, a management computer. The file server 101 and the management console 105 are coupled via the network interface in the same manner as connection with the client 104, and the settings are made by executing, for example, a Web browser on the management console 105. Note that the file server 101 may also serve as the management console 105. Similarly, the client 104 may also serve as the management console 105.

A set of one or more computers for providing the file service to the client 104 may be hereinafter sometimes referred to as the "file service system." If the file server 101 also serves as the management console 105, the file server 101 itself is the file service system.

Figure 2:
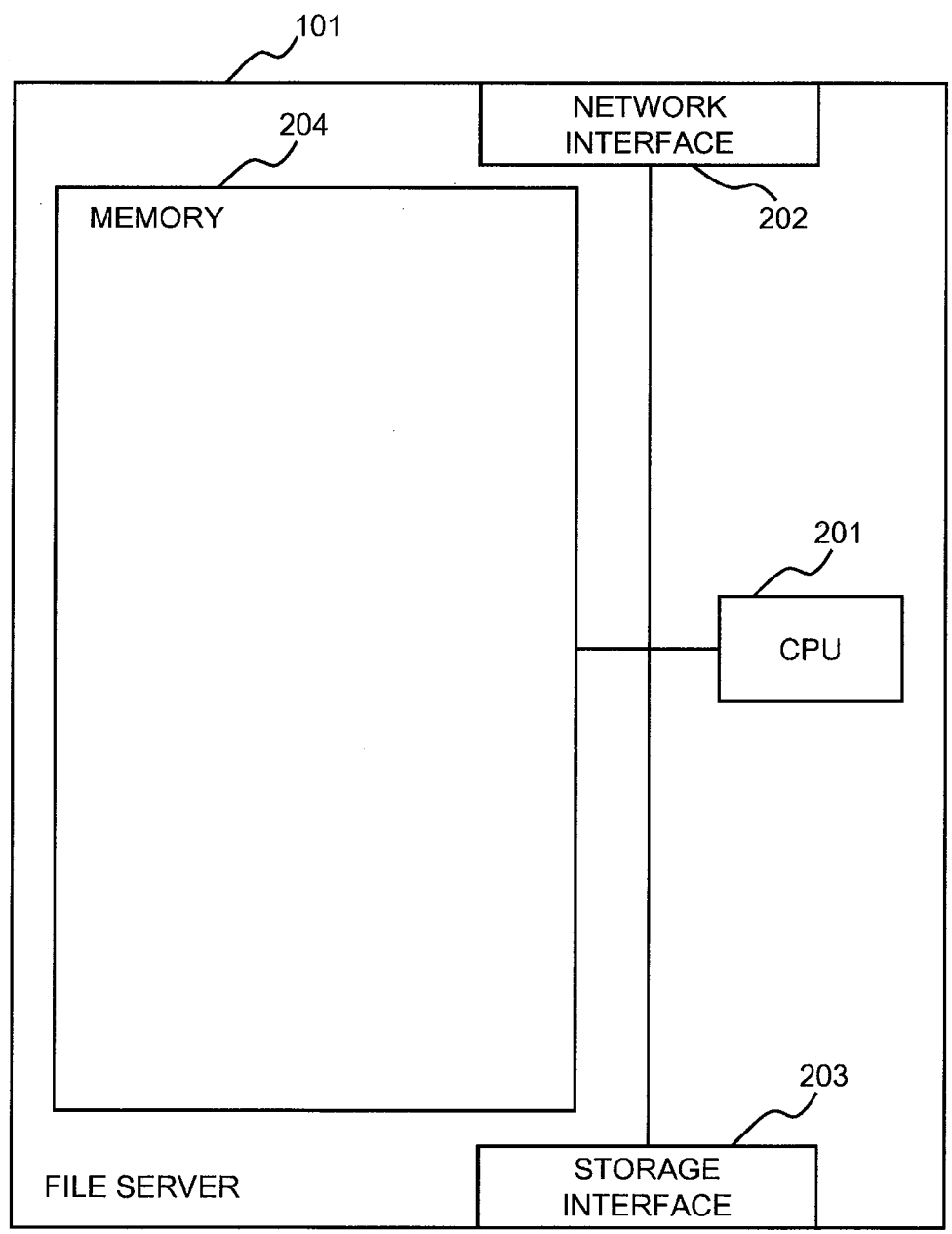
[FIG. 2]

FIG. 2 is a diagram showing the hardware configuration of the file server 101. The file server 101 is equipped with a memory 204 for temporarily storing programs and data and a CPU 201 for executing the programs stored in the memory 204. Furthermore, the file server 101 is equipped with a network interface 202 coupled to the client 104 and the management console 105, and a storage interface 203 coupled to the storage subsystems 102 and 103. Note that the network interface 202 and the storage interface 203 may also serve as the network interface 202 or the storage interface 203, and the file server 101 may include a plurality of shared interfaces of this type.

Note that the memory 204 may also be a semiconductor memory, a disk device, or a combination of the above. Furthermore, the storage regions provided by the storage subsystems 102 and 103 may also be used as swap regions of the memory 204.

Figure 3:
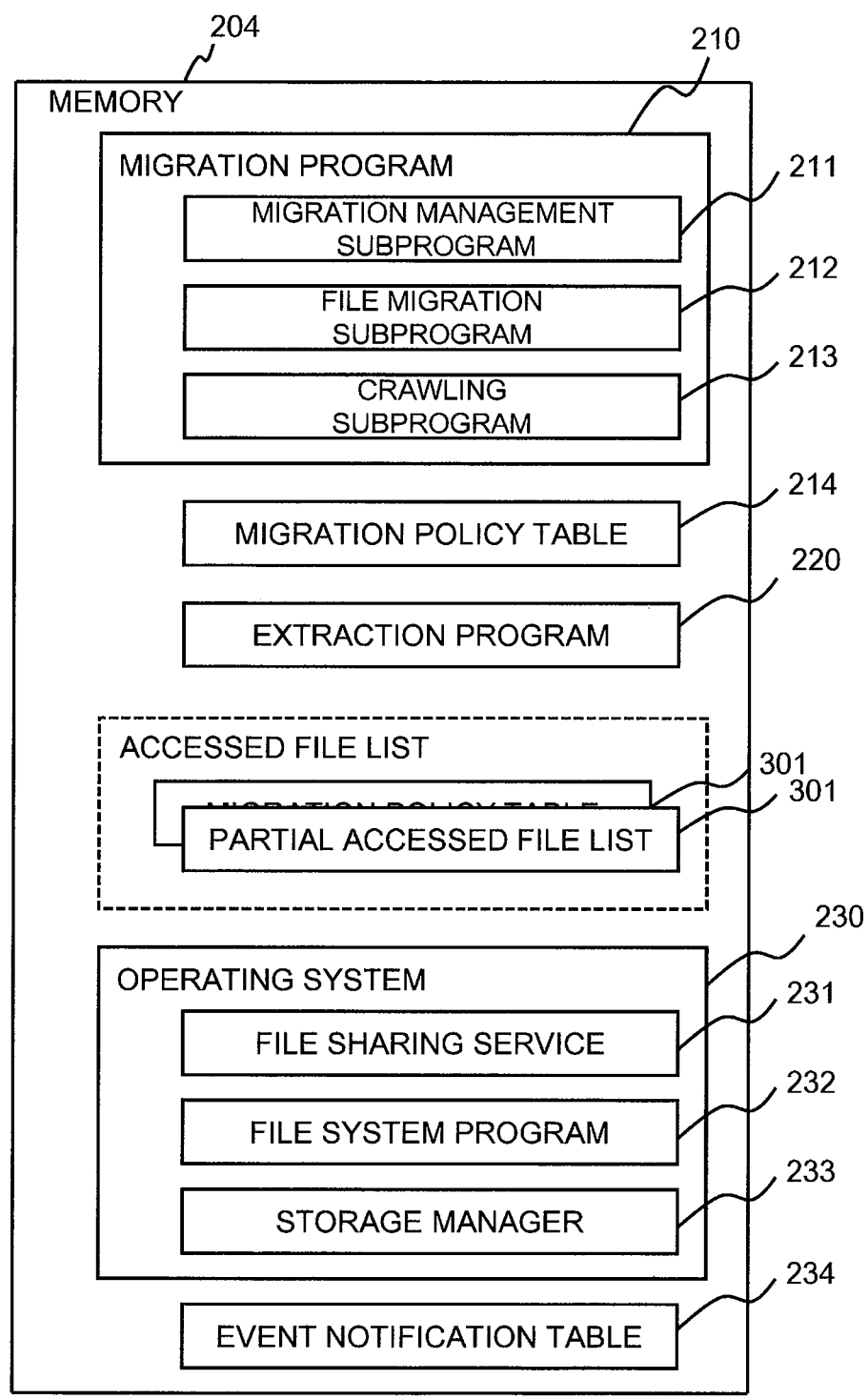
[FIG. 3]

FIG. 3 is a diagram showing programs and information stored in the memory 204 for the file server 101.

The memory 204 stores an OS (Operating System) 230 for providing the file access service and storing data in the storage subsystem. The OS 230 includes a file sharing service program 231 for providing the file access service, a file system program 232 for managing files, and a storage management program 233 for making a block read request or a block write request to the storage subsystems 102 and 103.

The file sharing service program 231 receives a file access request of a file sharing service from the client 104, and converts the file access request into a request to the file system program 232. After receiving the request, the file system program 232 performs processing on the storage management program 233, and returns a response to the file sharing service program 231. Furthermore, the file sharing service program 231 performs processing for, for example, returning data to the client 104 in response to the request and sending processing completion notice regarding the request. The file access service is realized as described above.

Note that the types of file access requests are a file read request, a file write request, a file deletion request, a file creation request, a file name (file path name, to be more exact) change request, a file access authority change request, a file owner change request, and a directory creation, change or deletion request. However, all of these file access requests do not necessarily have to be processible, and other types of requests may also be included as types of file access requests.

Note that the term "file system" represents data-structured storage regions so that file data can be stored in storage areas in the storage subsystems 102, 103, using meta-information. The expression "storing or creating a file in the file system" in the description below specifically means writing the relevant file data to the storage region, which is the substantial part of the file system, and updating the meta-information. On the other hand, when the file system refers to a file, it refers to the meta-information to identify the address where the file data is stored in the storage region which is the substantial part of the file system, and the file system program 232 reads the file data from the storage region which is the substantial part of the file system, and sends the relevant data to the requestor. Note that the meta-information is stored in the storage region and may also be cached to the memory 204 for the file server 101 in order to increase the processing speed. Note that the file data may sometimes be cached to the memory 204.

For ease of explanation, the following explanation is given without distinguishing a so-called "external path name" specified by the client 104 from a so-called "internal path name" internally managed by the file server 101. However, in fact, the file sharing service program 231 converts the file path name specified by the client 104 (the so-called "external path name") into a so-called "internal path name" by means of certain conversion, and specifies the obtained internal path name in a request to the file system program 232. Therefore, the path name specified by the request transmitted from the client 104 may also be interpreted as the external path name, and the path name used inside the file server 101 may also be interpreted as the internal path name; and the path name displayed on, or input to, the management console 105 may be interpreted as either the external path name or the internal path name. Incidentally, as a matter of course, the external path name and the internal path name may be the same.

The memory 204 stores a file migration program 210 for performing file level hierarchical storage management and a file extraction program 220 for extracting a file to be migrated.

The file migration program 210 includes a plurality of subprograms and executes the processing while referring to a file migration policy table 214.

Figure 8:
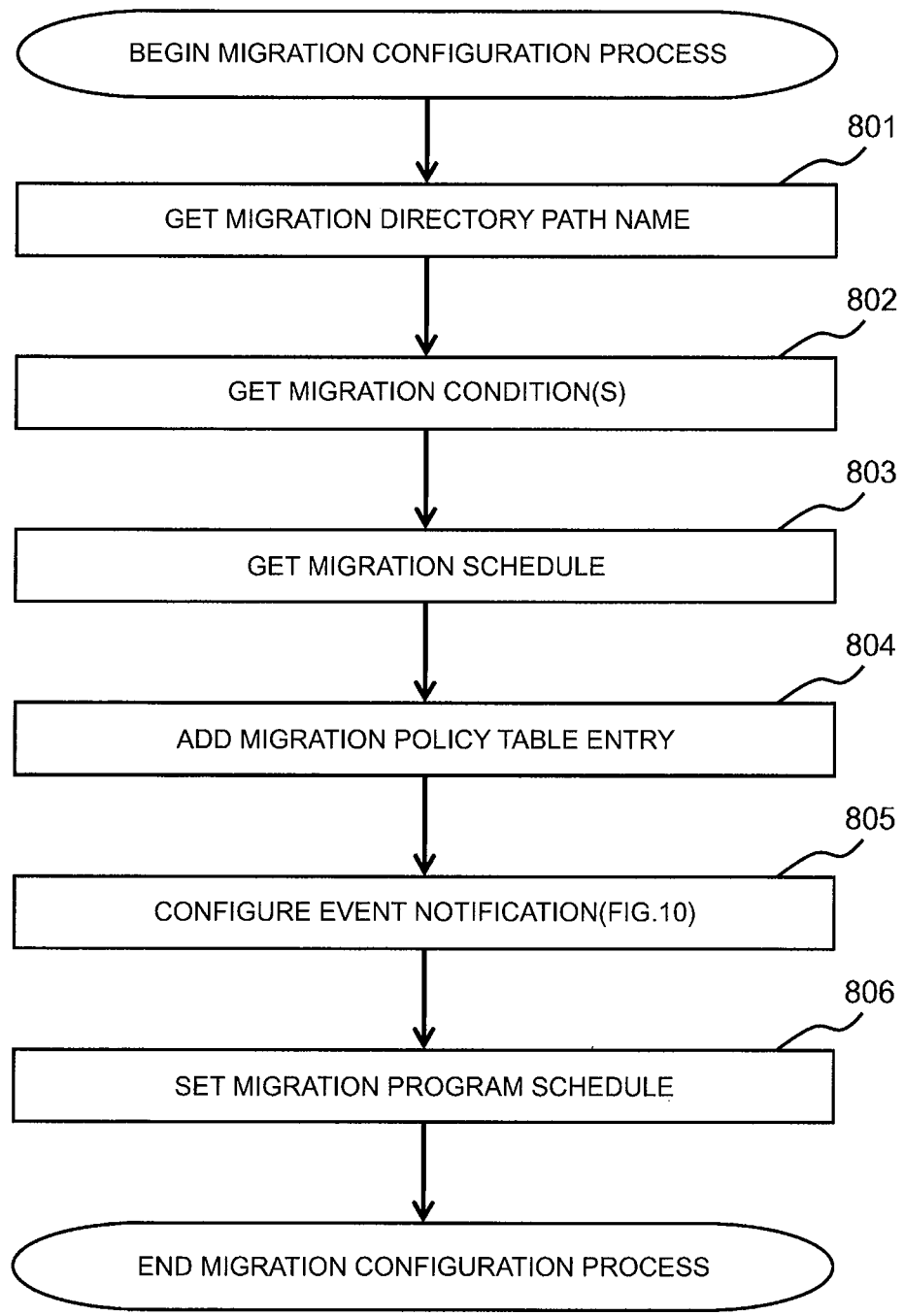
[FIG. 8]
Figure 14:
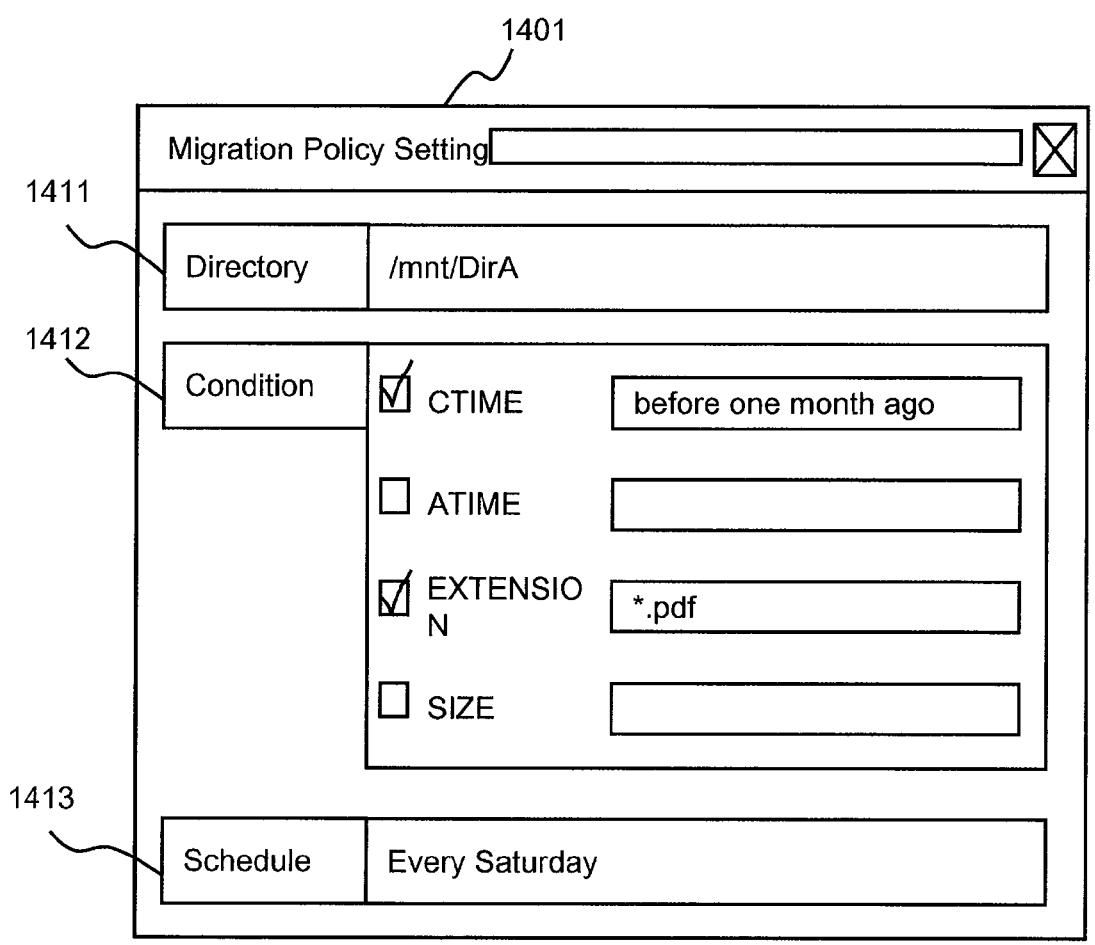
[FIG. 14]

A file migration management subprogram 211 provides a function that makes settings of file level hierarchical storage management. After the file migration management subprogram 211 sets, via the management console 105 operated by the user, a directory where file migration is performed, conditions of the file to be migrated, and a schedule of when to migrate the file, it stores the settings in the file migration policy table 214. Furthermore, the file migration management subprogram 211 sets the operations of the file extraction program 220 and the file migration subprogram 212 based on the above-mentioned configuration. The details of the file migration policy table 214 are shown in FIG. 4, the details of the file migration management subprogram 211 are shown in FIG. 8, and the content set by the file migration management subprogram 211 is shown in FIG. 14.

Figure 7:
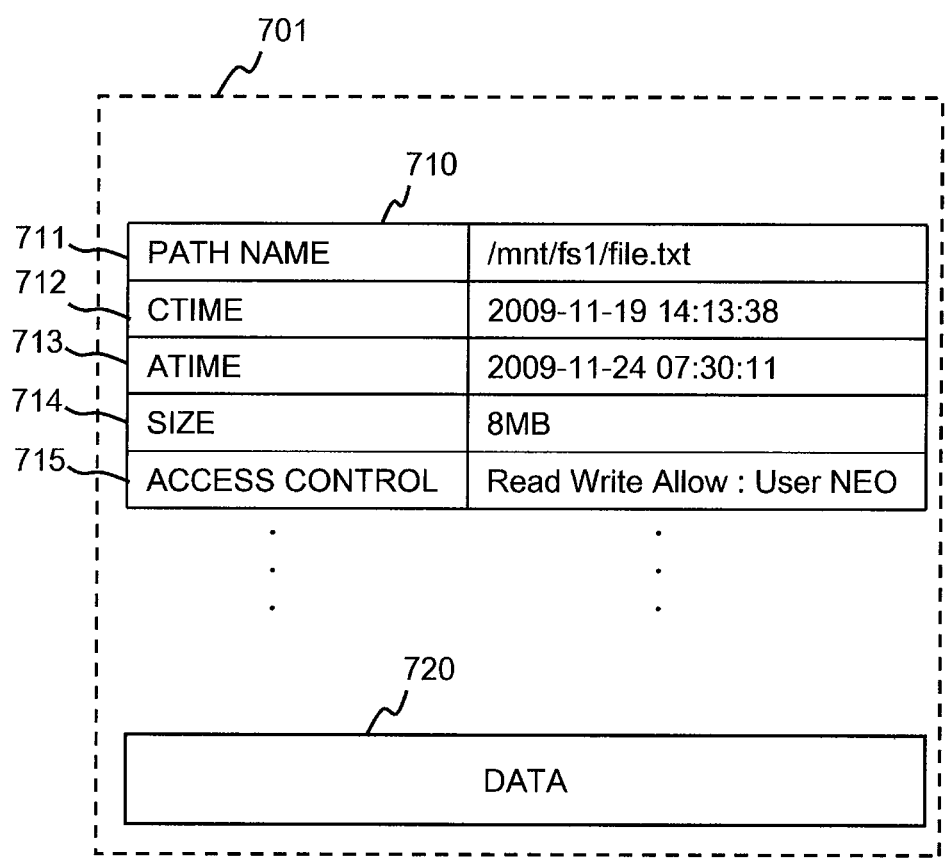
[FIG. 7]

The file extraction program 220 extracts the file to be migrated, from the file system. The conditions of the file to be extracted are based on the information stored in the file migration policy table 214 by the file migration management subprogram 211. The setting information is set to an event notice table 234 to which the file system program 232 refers. The file system program 232 notifies the file extraction program 220 of the relevant file and event regarding the event set to the event notice table 234. After receiving the notice, the file extraction program 220 registers the notice to a partial accessed file list 301 (hereinafter sometimes simply referred to as the "partial file list"). A plurality of partial accessed file lists 301 may be created in accordance with the conditions and schedule stored in the file migration policy table 214. FIG. 7 illustrates file meta-information and FIG. 6 illustrates the partial accessed file list 301. Note that information obtained by grouping one or more partial accessed file lists 301 may be sometimes referred to as the "accessed file list."

The file migration subprogram 212 performs file migration processing based on the content of the partial accessed file list 301 output by the file extraction program 220. The file migration subprogram 212 judges whether or not the file stored in the partial file list 301 satisfies the conditions specified in the file migration policy table 214 or not; and if the conditions is satisfied, the file migration subprogram 212 migrates the relevant file between the storage subsystems 102 and 103. The operation of the file migration subprogram 212 will be explained with reference to FIG. 9.

A file crawling subprogram 213 checks all the migration target candidate files to judge whether or not each file satisfies the conditions specified in the file migration policy table 214; and then performs the file migration. The file crawling subprogram 213 operates when a new condition is added to the file migration policy table 214 or when the existing file migration policy is changed. The operation of the file crawling subprogram 213 is described in FIG. 13.

Next, the overview of this invention will be described.

In order for the file service system to select a file to be migrated according to this invention, the file server 101 which has received an access request from the client 104, records the identifier (e.g. the file name or the path name) of a file which is the access target, to the accessed file list, and uses it when selecting the file to be migrated thereafter. One of possible methods for selecting the file to be migrated would be to select a file not recorded in the accessed file list; or, more specifically speaking, if it is intended to migrate a file older than the user specified time in the past, a possible method would be to select a file whose identifier is not recorded at time after the above-mentioned point of time in the past.

If the above-described method is used, it is unnecessary to access the meta-information about all the files in the storage regions of the storage subsystem 102 which is the migration source; however, if the number of accessed files is small, the number of files requiring access to the meta-information increases.

Figure 15:
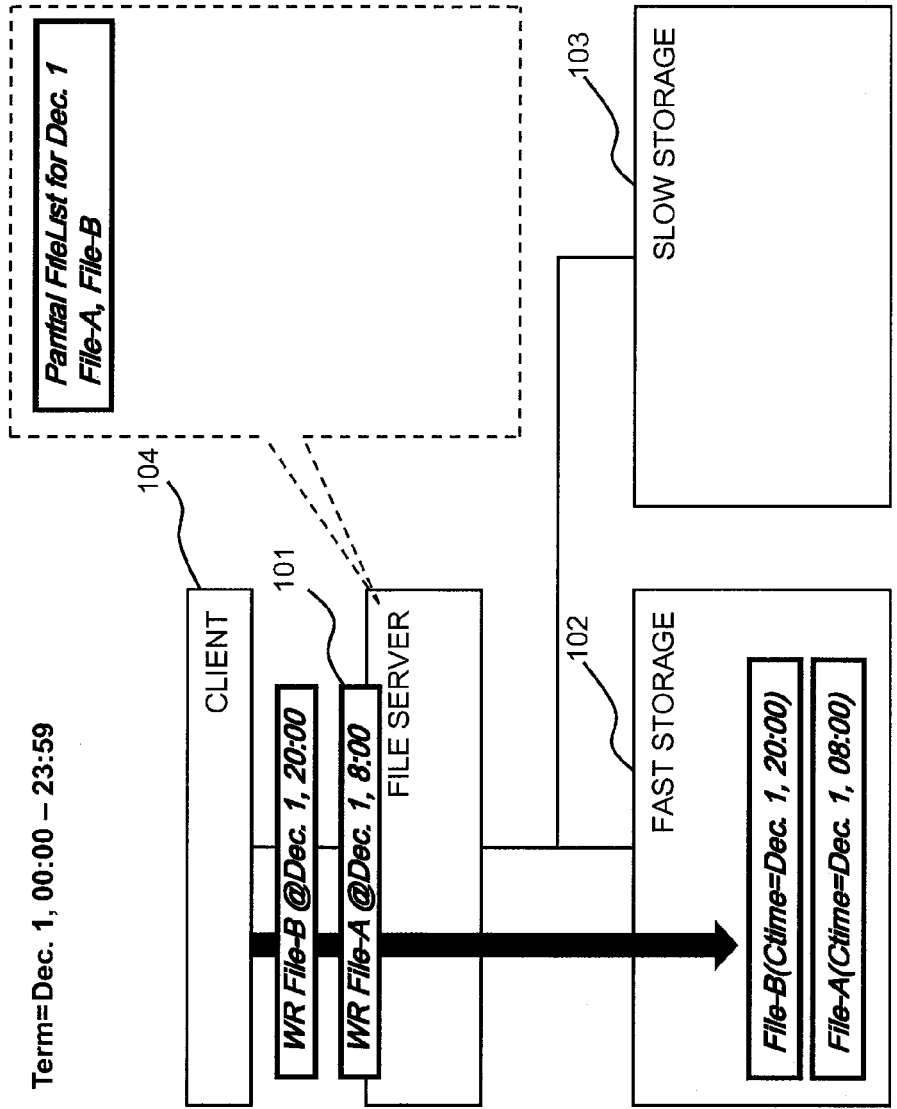
[FIG. 15]
Figure 16:
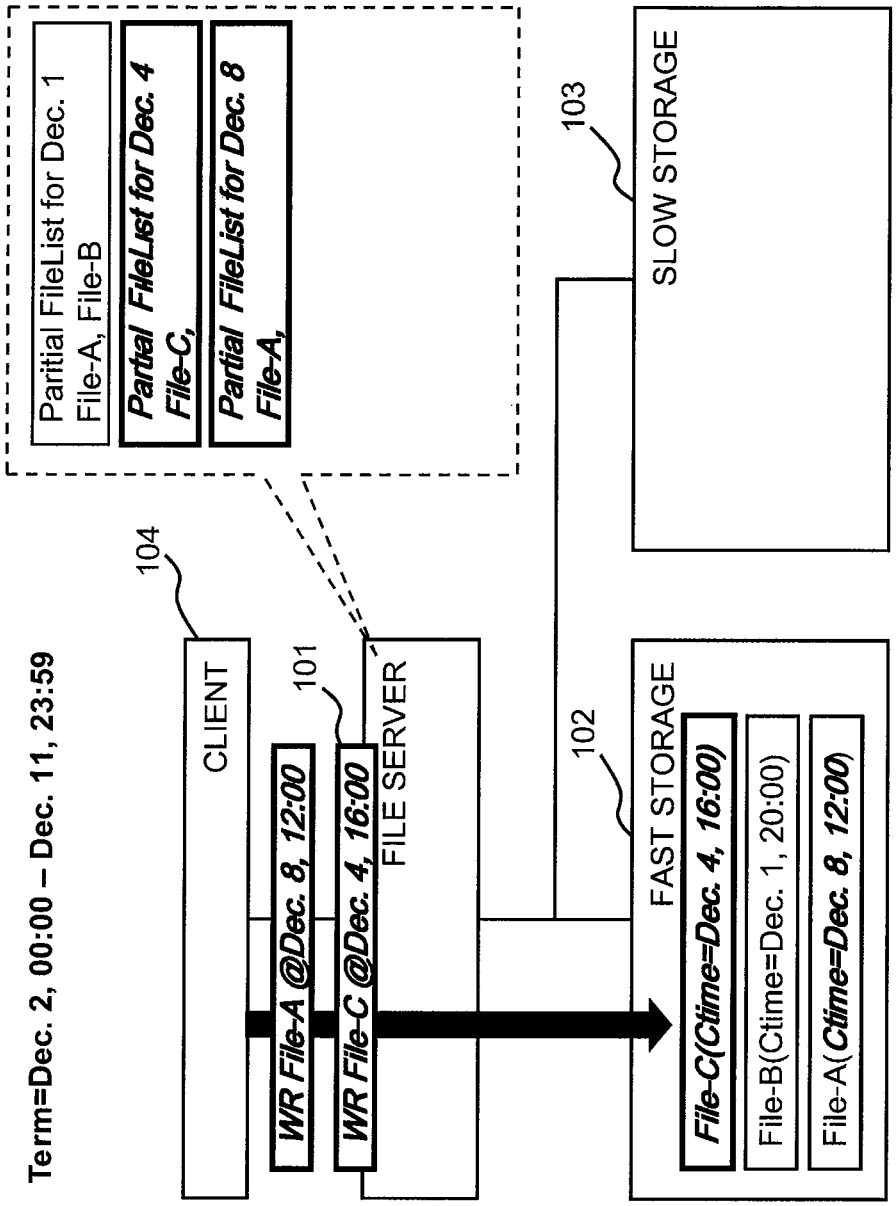
[FIG. 16]
Figure 17:
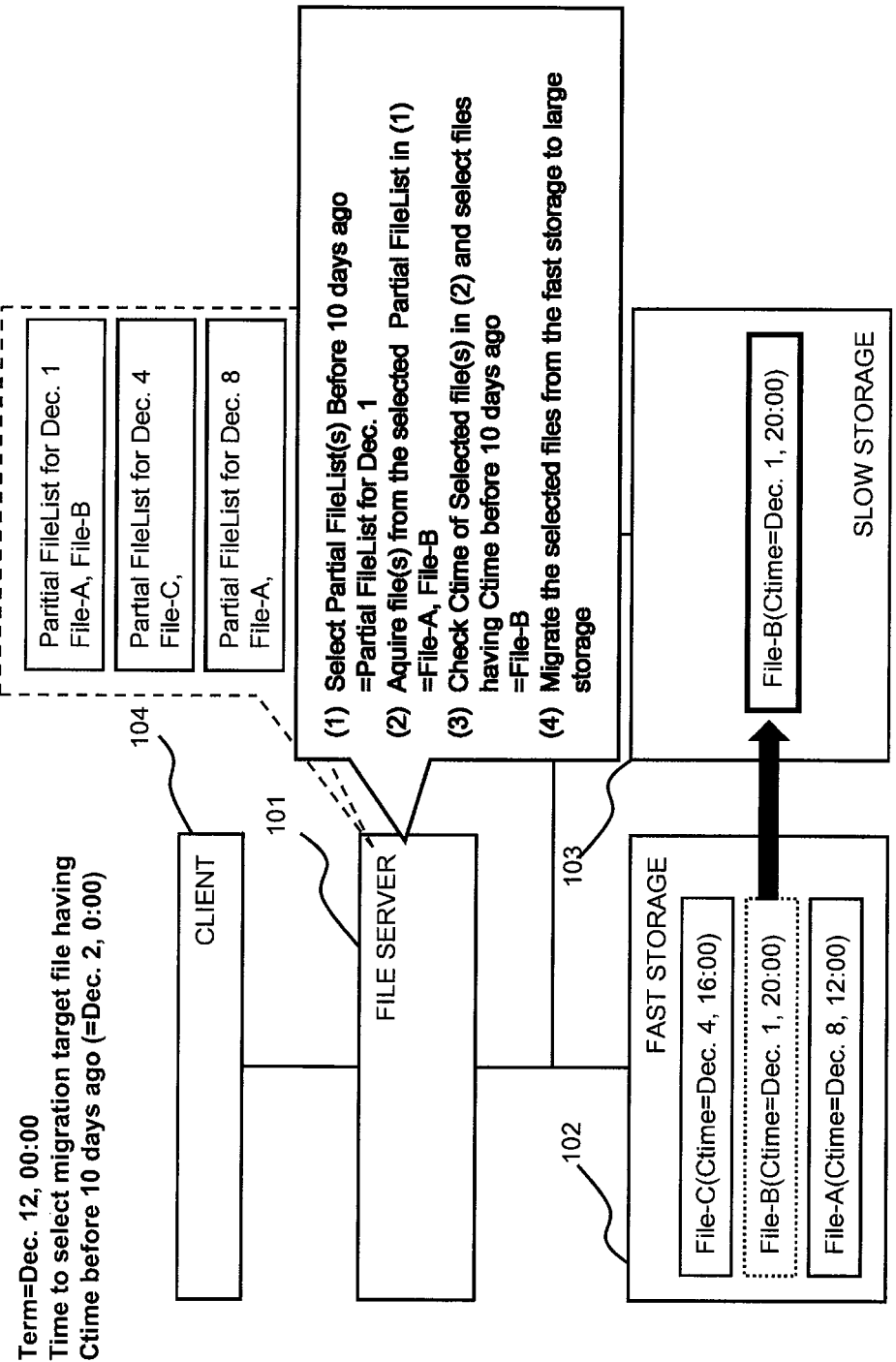
[FIG. 17]

FIGS. 15 to 17 are diagrams showing the overview of the processing for selecting a file to be migrated (migration target file) as described in detail later. Note that this overview shows an example of the condition in which a threshold time period is set to ten days and a file that is created or updated the file server 101 and the creation time or update time is before the time earlier than the current time by the length of the threshold time period is migrated from the storage subsystem 102 providing a high-performance storage region to the storage subsystem 103 providing a low-performance, but large-capacity storage region. In other words, this example of the condition is to retain files created or updated within the past 10 days from the current time in the storage subsystem 102. Incidentally, it is a matter of course that other conditions may be used to select the migration target file; and the performance is mentioned in the above example as the characteristic of the storage region, but other characteristics such as reliability may also be used. Note that "ctime" in the drawings at least indicates the last creation time or the last update time of the relevant file (a more accurate definition will be described later). Furthermore, an example of the performance as the characteristic of the storage region is the number or data amount of block read requests or block write requests that can be processed per unit time.

FIG. 15 is an example of the operation of the computer system performed from 00:00 to 23:59 on December 1st (more specifically, before 0:00 of December 2nd). In this drawing, the file server 101 receives the following write request from the client 104 and stores the file in the storage region of the storage subsystem 102.

A write request for file A received at 8:00 on Dec. 1st. As a result of processing of the request, the file server 101 stores the file data of file A and meta-information indicating that the ctime is 8:00 on Dec. 1st, in the storage subsystem 102.

A write request for file B received at 20:00 on Dec. 1st. As a result of processing of the request, the file server 101 stores the file data of file B and meta-information indicating that the ctime is 20:00 on Dec. 1st, in the storage subsystem 102.

Then, the file server 101 records the identifier of the accessed file in the memory 204 or the storage region of the storage subsystem 102 or the storage subsystem 103. Note that, in this example, as for files for recording the identifiers of the accessed files, a partial accessed file list 301 is created for each certain period of time (for example, a one-day period) and the identifiers are recorded in those files. Note that the same length of the time period does not have to be applied to each partial accessed file list 301. In the case of this drawing, the identifiers of file A and file B are stored in the partial accessed file list 301 whose period length is set as Dec. 1st.

FIG. 16 is an example of the operation of the computer system performed from 00:00 on Dec. 2nd to 23:59 on Dec. 11th (more specifically, before 00:00 of Dec. 12th). In this drawing, the file server 101 receives access requests as described below.

A write request for file C received at 16:00 on Dec. 4th. As a result of processing of the request, the file server 101 stores the file data of file C and meta-information indicating that ctime is 16:00 on Dec. 4th, in the storage region of the storage subsystem 102.

A write request for file A received at 12:00 on Dec. 8th. As file A already exists, as a result of processing of the request, the file server 101 updates the file data of file A, which is already stored in the storage region of the storage subsystem 102, with the write data, and further updates the meta-information to indicate that ctime is 12:00 on Dec. 8th.

Furthermore, the file server 101 records the identifier of the accessed file in the same manner as described with reference to FIG. 15. In this drawing, the file server 101 stores the identifier of file C in the partial accessed file list 301 whose time period is set as Dec. 4th; and stores the identifier of file A in the partial accessed file list 301 whose time period is set as Dec. 8th.

FIG. 17 shows the status of the computer system at 00:00 on Dec. 12th which is the time to determine the migration target file, and the overview of the migration file determination processing.

(Step 1) The file server 101 selects the partial accessed file list 301 corresponding to the time period before the time (00:00 on Dec. 2nd in this example) earlier than the current time by the length of the threshold time period. In this drawing, the partial accessed file list 301 for Dec. 1st is selected.

(Step 2) The file server 101 obtains the file identifier indicated by the partial accessed file list 301 selected at Step 1. In this drawing, the identifiers of the file A and the file B are obtained.

(Step 3) The file server 101 refers to the meta-information about the files indicated by the identifiers obtained at Step 2, and selects the files whose ctime is before the time earlier than the above-mentioned current time by the length of the threshold time period. In this drawing, as ctime of file A is 12:00 on Dec. 8th and the file server 101 detects that the file A was actually updated after Dec. 1st, the file server 101 does not select file A , but selects only file B.

(Step 4) The file server 101 migrates the file selected at Step 3 from the storage subsystem 102 to the storage subsystem 103.

Regarding the conditions for file migration, an additional condition other than the threshold time period may be specified. Therefore, a computer other than the file server 101 may also select the migration target file. In this case, the file server 101 may select files in consideration of only the threshold time period and then notifies the other computer of the selected files; and the other computer confirms the suitability of each notified file in consideration of the additional condition and then sends a file migration request to the file server 101. Furthermore, the file server 101 may have the other computer select the migration target file by providing the partial accessed file list 301 to that computer.

Note that the above-mentioned migration target file selection processing is repeatedly performed based on a condition for repeated performance specified by the user. However, even if this condition is changed, the partial accessed file lists 301 do not have to be re-created. In other words, it can also be said that the content of the partial accessed file lists 301, except for the part of the latest time period, is the same contents before and after the update of the above-mentioned condition (since the partial accessed file list 301 for the latest time period is updated as needed, its content is not necessarily the same before and after the update of the above-mentioned condition).

Note that, since the meta-information may be cached using the memory 204 for the file server 101, if reference is made to the meta-information in the processing at Step 3, reference may be first made to the memory 204.

Note that the expression "current time" used in this overview may be time obtained at any point of time by a clock of any computer as long as the computer or the processing for determining the migration target file recognizes such time as the current time when evaluating the threshold time period. For example, it is possible that the migration target determination processing might be temporarily suspended by process scheduling of the operating system; and in that case, even if the current time is adopted from the computer clock before Step 1, that cannot be technically defined as the current time when processing Steps 2 to 4. Furthermore, since the client 104, the file server 101, the storage subsystem 102 and the storage subsystem 103 have their own clocks respectively, the clocks indicate slightly different times even for the technically same point of time. This might also happen when NTP (Network Time Protocol) or the like is used.

However, when a file is to be migrated from a high-performance storage region to a low-speed storage region, if a file which was recently updated after the point of time (0:00 on Dec. 2nd in this example) earlier than the current time by the length of the threshold time period is migrated from the high-performance storage region to the low-performance storage region, it seems to the user as if unexpected degradation of the access performance has occurred. Although this is an extreme example, if the clock of the file server 101 shows time approximately one day ahead of the actual time and the file server 101 executes Step 1 to Step 4 by mistakenly recognizing the current time to be 00:00 on Dec. 12th when the actual time is 0:00 on Dec. 11th, the access performance for file B could have remain high until 00:00 on Dec. 12th, but will degrade one day earlier.

In order to avoid the above-described situation, a longer threshold time period for actual evaluation may be set by adding a specified margin to the threshold time period for judgment in Step 1 to Step 3 or by multiplying the threshold time period by the margin.

The overview of this invention has been described above.

FIG. 4 is a diagram showing the content of the file migration policy table 214. A plurality of file migration policies (corresponding to the conditions for the above-mentioned migration) can be registered in the file migration policy table 214. In each policy, a directory to which the policy is applied, a condition(s) for file migration, and a file migration schedule are set.

Fields from 411 to 414 and from 421 to 424 in FIG. 4 respectively constitute file migration policies.

In the fields 411 and 421, path names of directories which are targets of the file migration policy are set. The field 411 is set so that the target directory of the file migration policy is /mnt/fs1; and the field 414 is set so that the target directory of the file migration policy is /mnt/fs2.

The conditions for the file migration policies are set to the fields 412, 413, 422, and 423.

For the directory path name 411, the conditions 412 and 413 are set. The condition 412 is set so that a file whose "ctime" is one month or more before the current time should be migrated. The condition 413 is set so that a file whose extension is pdf should be migrated. As mentioned above, a plurality of conditions can be set and files that satisfy all the conditions can be migrated. If a file that satisfies plurality of conditions is to be migrated, it is only necessary to set a plurality of migration policies to a certain path name.

The conditions 422 and 423 are set to the directory path name 421. The condition 422 is set so that a file whose "atime" (last accessed time of the file) is one week or more before the current time should be migrated. The condition 423 is set so that a file whose size is 10 MB or larger should be migrated.

Note that ctime (last update time of the file) in UNIX (trademark) is updated to that point in time when a file is created or update, and also when a change is made to any of (1) the file name, (2) the file size, (3) the right of access to the file, (4) the file owner. Therefore, when the threshold time period is judged based on ctime, the identifier of the file to which the above-described change is made may also be stored in the partial accessed file list. Incidentally, UNIX (trademark) uses information called "mtime" which is meta-information, as information indicating the last time when the relevant file was created or updated. However, it is obvious that this invention can be also used for mtime.

Note that, in this description, a path name is information including a directory name and a file name, which is necessary information to uniquely identify a file in the file system managed by the file system program 232. Furthermore, the file name is information capable of uniquely identifying a file in the parent directory where the file exists. Therefore, if the name of the parent directory where a certain file is stored is changed, the resulting situation is that the path name is changed, but the file name does not change.

Regarding migration target files, various attributes such as file path names and file access control information can be set in addition to update time of these files, file identifiers (which may be included in file names), last accessed time of the files, and file sizes.

A file migration schedule is set to the fields 414 and 424.

The field 414 is set so that file migration should be performed every Saturday. The field 424 is set so that file migration should be performed on the first day of each month. In accordance with these conditions, the file extraction program 220 creates the partial accessed file lists 301. In the example shown in FIG. 4, the file extraction program 220 creates the partial accessed file list 301 for the file stored in /mnt/fs1 and the partial accessed file list 301 for the file stored in /mnt/fs2.

Regarding the conditions for the file migration policies, it is only necessary to set the above-mentioned threshold time period (hereinafter sometimes referred to as the "migration threshold time period") as the evaluation condition regarding ctime or atime. Note that, as mentioned above, the migration threshold time period is the setting condition to select a file whose ctime or atime is before the point in time in the past earlier than the current time by the migration threshold time period, to be the migration target; conversely, the setting is made to prevent migration of a file whose ctime or atime is after the time earlier than the current time by the migration threshold time period. However, naturally, there are some cases where the file migration in the above-described situation cannot be prevented if the capacity of the high-speed storage region becomes insufficient.

FIG. 5 is a diagram showing an example of a file event(s).

The event notice table 234 includes one or more pairs of a file path name 501 (hereinafter sometimes simply referred to as the "path name") and a notice event 502 describing the type of an event to be reported when the event matches the file path name 501. A plurality of such pairs may be set in accordance with the settings of the file migration policies.

A file event 503 shows that an event notice is given if ctime of a file whose file path name starts with /mnt/fs1 is updated. Furthermore, a file event 504 shows that the event notice is given if a file whose file path name starts with /mnt/fs1 is created. A file event 505 shows that the event notice is given if the file path name of a file starts with /mnt/fs2 and its file extension is pdf and when the file is created. A file event 506 shows that the event notice is given if reference is made to a file whose file path name starts with /mnt/fs3 and if atime is updated.

In addition to the above-described conditions, various settings can be made to the file events such as file path names or file access control information.

FIG. 6 is a diagram showing an example of the partial accessed file list 301. A plurality of partial accessed file lists 301 are created in accordance with the schedule of the file migration policies. Identifiers (path names in this drawing) 601 of files which are the access targets defined by the file migration policy for each time period (e.g. a one-day period) are registered in the partial accessed file lists 301. In other words, regarding the files concerning which whether to migrate them or not should be determined according to this invention, the identifiers of the accessed files are stored in any of the partial accessed file lists 301 separated by time periods with reference to the accessed time.

Fields 603 to 606 shows the path names of files to be migrated when performing file migration. As the path names show, if a file migration policy is set to a plurality of directory path names, the partial accessed file lists 301 may be integrated to register a plurality of file path names. Furthermore, the example shown in FIG. 6 takes the form in which the file path names are registered in a list; however, it is not always necessary to use such a list. Incidentally, a file registered in the partial accessed file list 301 may have a file name including the aforementioned target time period (or a file name that can uniquely identify the target time period), but may not necessarily have to have such a file name. Note that the target time period may be included in the partial accessed file list 301. Furthermore, as another form of the partial accessed file list 301, in accordance with the file migration schedule, it may also be permitted to create a directory may be created in the file system according to the file migration schedule and a symbolic link to the file to be migrated may be set under the directory, and the resultant information may be used instead of the above-described partial accessed file list 301 (although the above two types are different in terms of data structures, but they are substantially the same in terms of the information indicating the files accessed during a certain time period).

FIG. 7 is a conceptual diagram of a file handled according to in this invention. A file 701 includes meta-information 710 and file data 720 to be retained as a file.

The meta-information 710 includes information for accessing the relevant file and various types of information relating to that file. A file path name 711 conceptually represents the place where the relevant file accessed by the client 104 exists. The file path name is specified when the client 104 accesses the file. File update time CTIME 712 stores the time when the file is created or updated. File access time ATIME 7113 stores the last time when the client 104 read the file. The file size SIZE 714 shows the total capacity of the file data 720. Access control information ACCESS CONTROL 715 stores the user who created the file and the permitted access. FIG. 7 shows that the user NEO is allowed to read and write (update) the file. The capacities of these pieces of meta-information 710 are variable in accordance with the file system and the set access control information ACCESS CONTROL 715. A general file system can have these pieces of meta-information 710.

The file data 720 retains the substantial part of the data stored as files. Since the file system retains the substantial part of the data as a pair with the meta-information 710, the client 104 can access the desired data. More precisely, the file data can be accessed by designating the file name because the meta-information 710 has a block address in the storage region where the file data 720 is stored.

FIG. 8 is a diagram showing the processing flow of the management program making the file migration setting. The processing of the file migration management subprogram 211 is described below with reference to the drawing. Note that this processing is performed when making the file migration setting.

(Step 801) The file migration management subprogram 211 obtains the path name of the directory as the file migration target.

(Step 802) The file migration management subprogram 211 further obtains the condition for the file to be migrated.

(Step 803) The file migration management subprogram 211 obtains the file migration schedule regarding this directory path name and the migration condition.

(Step 804) The file migration management subprogram 211 recognizes the above-obtained information as one file migration policy, and adds the setting to the file migration policy table 214.

(Step 805) The file migration management subprogram 211 sets the event notice to the file system program 232 in order to set the processing for extracting the files to be migrated.

(Step 806) The file migration management subprogram 211 sets the execution schedule of the file migration program 210 for executing the file migration and then completes the processing.

The above-described processing by the file migration management subprogram 211 can be executed more than once in accordance with the settings of the file migration policy. Furthermore, the processing executed by the file system program 232 for which the event notice is set at Step 805 will be described later in detail with reference to FIG. 10.

Note that the acquisition of the values of Steps 801 to 803 is performed by the file migration management subprogram 211 when receiving various input values input to the management console 105 by the administrator on a screen described later in detail with reference to in FIG. 14.

Figure 9:
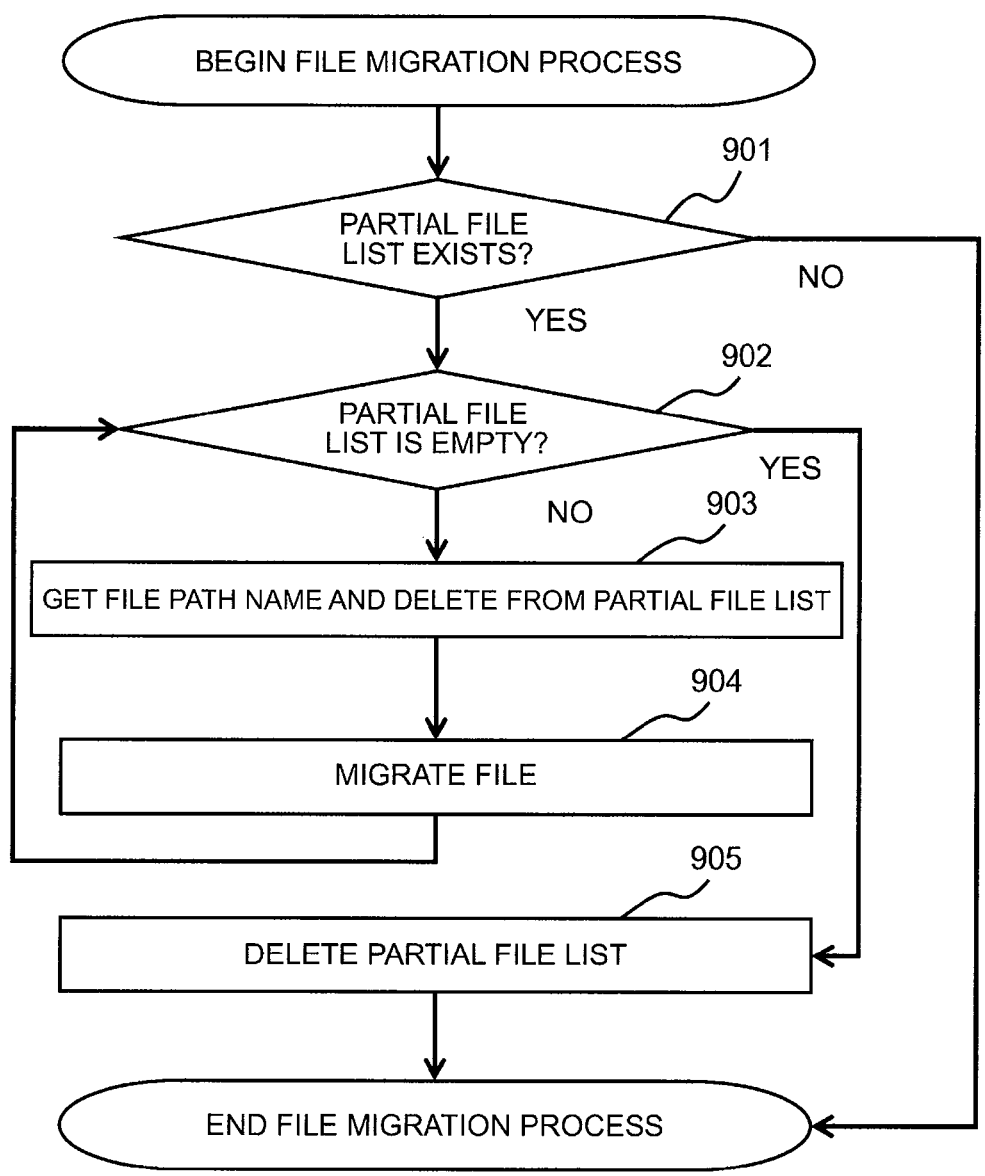
[FIG. 9]

FIG. 9 is a diagram showing a flow of processing executed by the file migration subprogram 212 for migrating files.

The file migration subprogram 212 is executed in accordance with the schedule set to the file migration policy table 214. The processing will be described below with reference to this drawing.

(Step 901) After starting the processing, the file migration subprogram 212 first judges whether the partial accessed file list 301 to which reference should be made during the file migration exists or not (corresponding to (1) in FIG. 17). If the partial file list 301 to which reference should be made does not exist (NO), the program completes the processing. If the partial file list 301 to which reference should be made exists (YES), the program migrates the file described in the partial file list 301.

(Step 902) The file migration subprogram 212 judges whether or not any path name of a file for which data migration has not been performed yet is described in the partial file list 301; and if such a path name exists (NO), the program proceeds to processing in Step 903 and subsequent steps. If the file is not described (YES), this means that the processing has been executed on all the files, so that the program executes Step 905.

(Step 903) If any file is described in the partial file list 301, the file migration subprogram 212 temporarily obtains the file path name inside the program, and deletes the file name from the partial file list 301.

(Step 904) The file migration subprogram 212 refers to the meta-information 710 stored in the file system and the conditions in the file migration policy table 214 with regard to the file path name obtained in Step 903; and, if the information matches the migration policy, the program migrates the file data from the current storage region to another storage region. Then, the program returns to the processing in Step 902, and continues the file migration processing.

(Step 905) The file migration subprogram 212 deletes the partial file list 301 and then completes the processing.

Whether or not the file described in the partial file list 301 matches the migration policy is judged because of, for example, the reasons described below.

* The above-described judgment is done in order to deal with a case in which a file is changed after the file path name is described in the partial file list 301. For example, if the policy is set so that that the file is to be migrated if the file size is 10 MB or larger, it is possible that the file is created in the size of 11 MB and then the size is changed to 9 MB. Since the processing for deleting the file from the partial file list 301 if the file size is changed, is not executed according to this embodiment, the above-mentioned judgment is done before the file migration is executed. In this case, whether reference should be made to ctime 712 or atime 713 of the meta-information 710 is judged according to the conditions in the file migration policy table 214; and ctime 712 or atime 713 concerning which the judgment is returned that reference should be made to them is read from the meta-information 710 stored in the file system (or cached in the memory 204) for the matching judgment in Step 904. Furthermore, there is also a possible method of not executing the policy condition judgment upon file migration by having the file extraction program 220 dynamically update the partial file list 30.

The above-described judgment is done because there is a file which is not to be migrated during the latest processing, due to the condition other than the accessed time of the file. In this case, the file migration program may write the path name of the file, which did not match the condition other than the accessed time in Step 904, back to the partial file list 301, and skip the processing in Step 905.

Incidentally, as an example of the file data migration performed in Step 904, it is possible that the file migration subprogram 212 performs the following processing:

Step A: read the file data from the storage region where it is currently stored;

Step B: write the read file data to another storage region; and

Step C: Update the information indicating the address of the file data in the meta-information 712 to the identifier of the storage region, which is the write destination, and the address in the storage region.

However, the file data migration may be performed by another computer or implemented in another step as long as part of or the entire file data of the migration target file can be migrated from the currently stored storage region to another storage region. Furthermore, the meta-information 710 may also be migrated together with the file data.

Figure 10:
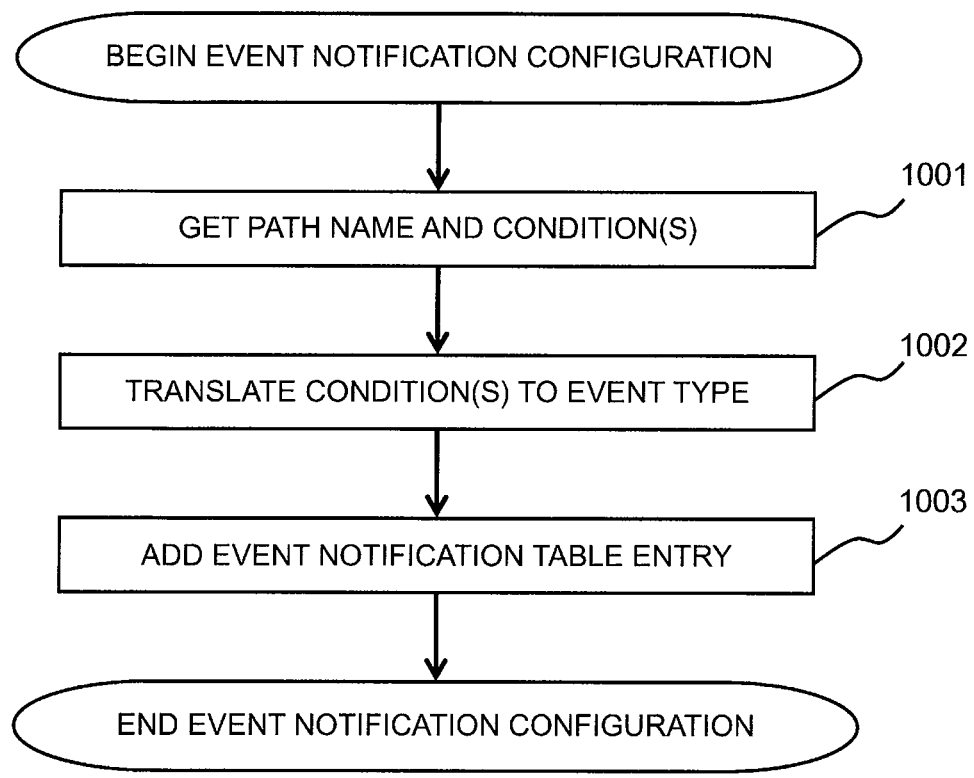
[FIG. 10]

FIG. 10 is a diagram showing a flow of the event notice setting processing executed by the file system program 232 during the setting in Step 805 in FIG. 8.

The file system program 232 has a program interface for making the event notice setting. The file extraction program 220 makes the event notice setting via this program interface. The processing will be described below with reference to the drawing.

(Step 1001) The file system program 232 obtains the path name of the file, for which the setting is made, and a notice condition from the file extraction program 220.

(Step 1002) The file system program 232 converts the condition into the event type that can be detected by the file system.

(Step 1003) The file system program 232 completes the processing by adding an entry of the converted condition to the event notice table 234 belonging to the file system program 232.

If there are a plurality of conditions for this processing, the conversion into the event type and the addition of an entry to the table need to be performed more than once.

Figure 11:
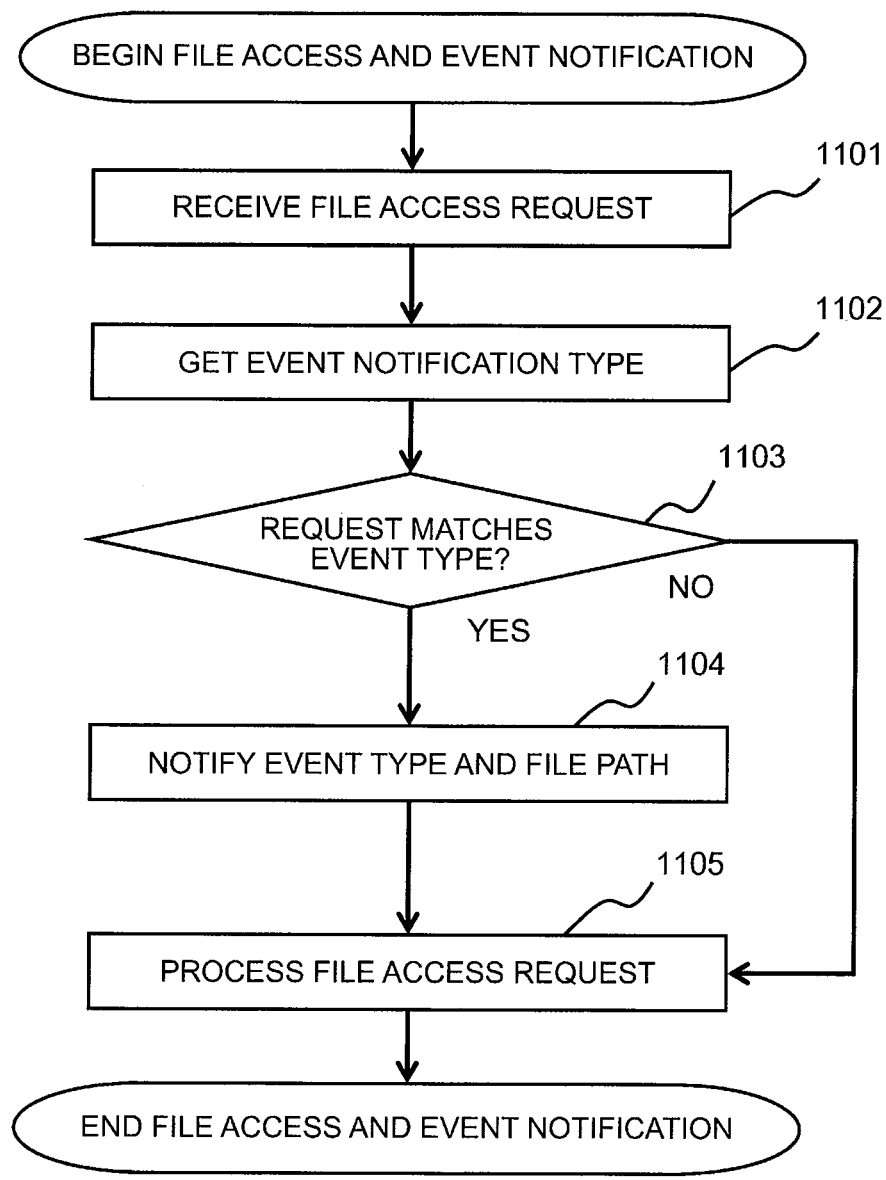
[FIG. 11]

FIG. 11 is a diagram showing a flow of file access processing and event notice processing executed by the file system program 232 when receiving a file access request from the client 104. The processing will be described below with reference to the drawing.

(Step 1101) The file system program 232 receives a file access request.

(Step 1102) The file system program 232 obtains the type of event notice set to the event notice table.

(Step 1103) The file system program 232 judges whether the file access request matches the type of event notice or not. If it is not necessary to give event notice (NO), the program proceeds to processing in Step 1105. If the request matches the type of the event notice (YES), the program proceeds to processing in Step 1104. If the notice regarding CTIME is required and the file access request is a request for file creation or update, the judgment of whether the file access request matches the event notice type or not will result in an affirmative judgment.

(Step 1104) The file system program 232 notifies the file extraction program 220 of the event type and the path name of the file.

(Step 1105) The file system program 232 refers to the meta-information 710, executes the processing of the file access request, and completes the processing. As the file access request processing, for example, the file data is stored in a storage region and the file data read from the storage region is returned. Although a high-speed storage region is normally considered to be the storage region in which the file data should be stored, the file data may be also stored in a low-speed storage region. Furthermore, although both the high-speed storage region and the low-speed storage region can be considered as the storage region from which the file data is read, the file data may be migrated from the low-speed storage region to the high-speed storage region and then read from the high-speed storage region, instead of reading the file data from the low-speed storage region.

Incidentally, the file access processing may be executed as triggered by events other than the reception of a file access request.

Figure 12:
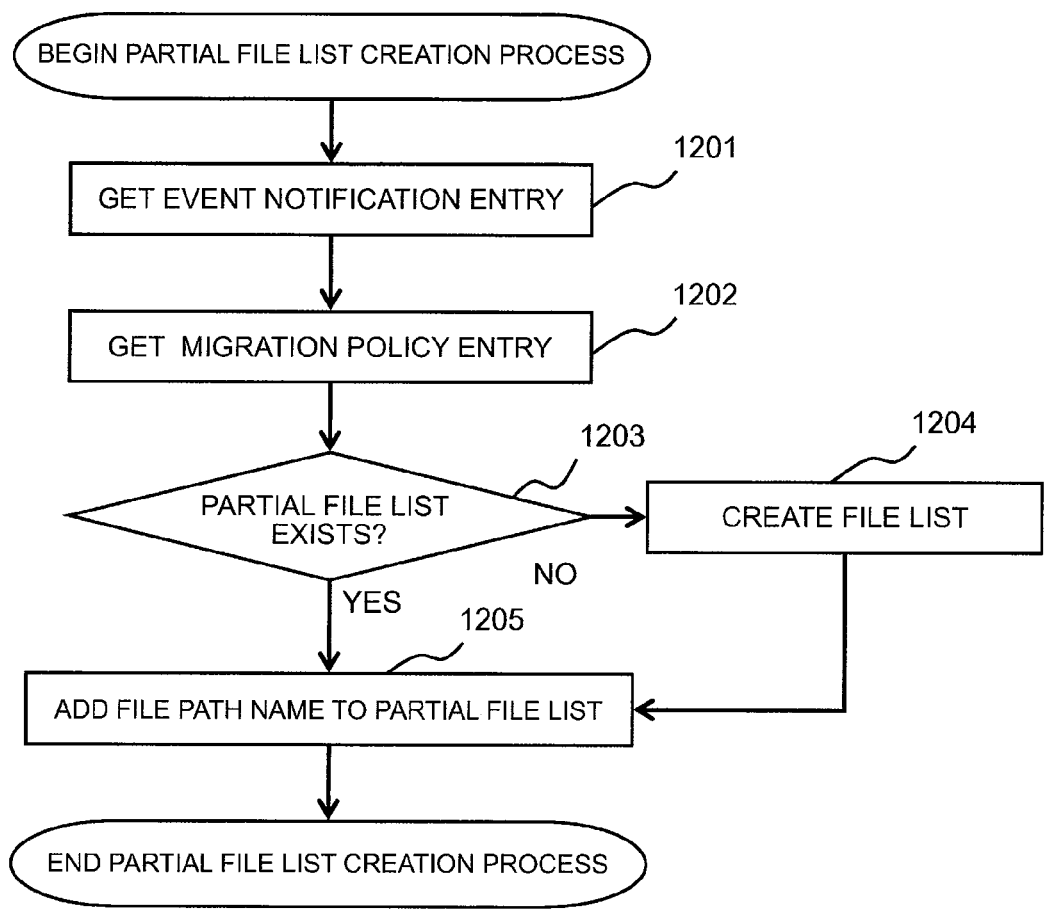
[FIG. 12]

FIG. 12 is a diagram showing a flow of partial file list creation processing executed by the file extraction program 220. The processing will be described below with reference to the drawing.

(Step 1201) The file extraction program 220 receives an entry of a file update event notice from the file system program 232.

(Step 1202) The file extraction program 220 also obtains a file migration policy from the file migration policy table 214.

(Step 1203) The file extraction program 220 judges whether a partial file list 301 that satisfies the condition set to the file migration policy exists or not. If such a partial file list 301 does not exist (NO), the program executes Step 1204; and if such a list already exists (YES), the program process to processing in Step 1205.

(Step 1204) The file extraction program 220 creates a partial file list 301.

(Step 1205) The file extraction program 220 obtains the file path name from the entry for which the event notice was given, adds it to the partial file list 301, and completes the processing.

This embodiment describes an example where all the file path names for which the event notice has been given are added to the partial file list 301. Whether the file name already exists in the partial file list 301 or not is judged in order to prevent an increase of the capacity of the partial file list 301; and if the file name does not exists, it should be added. In this way, duplicate registration of the file name in the partial file list 301 is prevented. As the method of judging whether the file path name exists in the partial file list 301 or not, there are possible methods of: searching the partial file list 301 from its top for the file path name; and comparing collisions of hash values of the file path names. If the hash values are used, the partial file list 301 needs to be created with expressions using the hash values. However, since the processing for preventing duplicate registration increases load imposed during the file access request processing, the file system program 232 may not prevent the duplicate registration of a file name in the partial file list 301 which is the current target of the addition processing; and when the relevant file path name becomes the target to be added to another partial file list 301 (i.e., when the relevant partial file list 301 no longer belongs to the latest time period), the duplicate file path name may be deleted.

Figure 13:
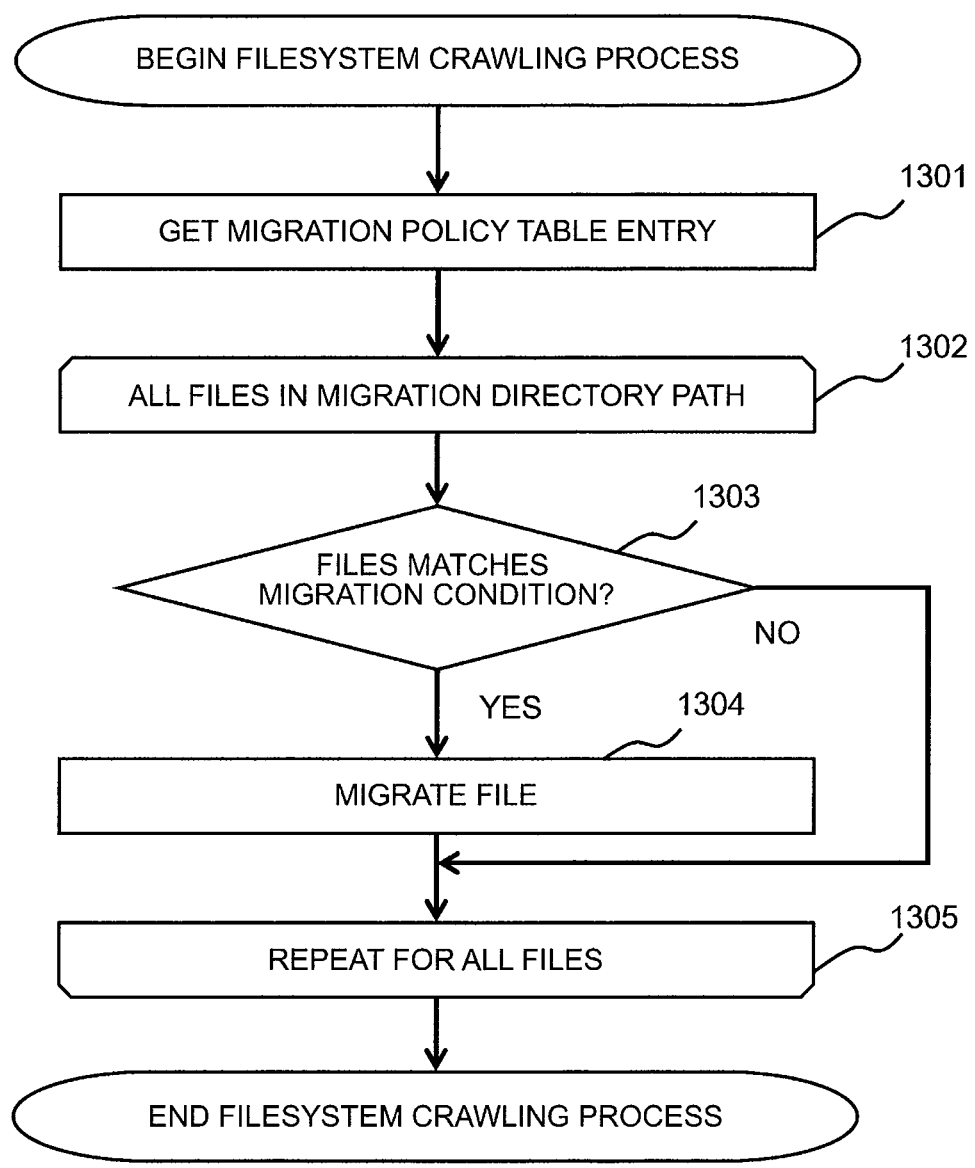
[FIG. 13]

FIG. 13 is a flow of processing executed by the file crawling program 213. The file crawling program 213 operates when a new file migration policy is set or when the existing policy setting is changed. This is because file update event notice is not given unless a file access request is made. For example, if a new file migration policy is newly set to the directory where a file is already stored, even if the existing file satisfies the migration policy, the file will not be described as the migration target in the partial file list 301. Therefore, it is necessary to activate the file crawling program 213. The processing will be described below with reference to the drawing.

(Step 1301) The file crawling program 213 obtains a file migration policy from the file migration policy table 214.

(Step 1302, Step 1305) The file crawling program 213 repeatedly executes processing in Step 1303 and Step 1304 on all the files existing under the directory path name registered in the file migration policy.

(Step 1303) The file crawling program 213 judges whether the file satisfies the migration condition or not, with regard to the file which should be judged to find whether it is a migration target or not. If the file does not satisfy the migration condition (NO), the program terminates the processing on the file. If the file satisfies the condition (YES), the program proceeds to Step 1304.

(Step 1304) The file crawling program 213 executes the file migration processing.

This embodiment has described the example where file migration is performed if the file crawling program 213 is performed. In order to perform file migration in accordance with the file migration schedule, the file crawling program 213 may describe the file path name of the migration target file in the partial accessed file list 301.

If the change of the file migration policy is only a change of the migration threshold time period, the execution of the above-described file crawling program 213 may be omitted. This is because, if the migration threshold time period is changed, it is only necessary to select the partial file list 301 including the time period before the time earlier than the current time by the length of the changed migration threshold time period, as it always has been selected, as the partial file list to which reference should be made in Step 901 to 903 in FIG. 9.

FIG. 14 is a diagram showing an example of the setting screen of the management program making the file migration setting.

A management screen 1401 of the file migration configuration management program is invoked by being coupled to the file server 101 by the management console 105. Items are set on the management screen 1401 as a file migration policy. A directory 1411 as a target to which the file migration policy is set can be set. Furthermore, a condition 1412 for performing file migration can be set to the directory 1411. The condition for file migration can be set by selecting it from among CTIME, ATIME, a file extension, the size and others. Furthermore, a schedule 1413 for performing file migration can be set.

The condition 1412 for performing file migration and the schedule 1413 do not necessarily have to be limited to the example in FIG. 14. These fields can be extended in accordance with the meta-information retained by the file system or extended to set a plurality of schedules.

Note that there is a tendency to receive a large amount of file read requests and file write requests as compared to other types of requests. The following processing may be executed, utilizing the above-described tendency, in order to reduce the size of the partial accessed file lists 301 and the load on the processing of addition to the lists.

(Improvement Plan 1) File path names are not added to the partial accessed file lists 301 in response to file read requests and file write requests. Instead, atime or ctime of the file closed at the time of closing it is checked and the path name of the closed file is added to the partial accessed file list 301 for the time period corresponding to the time indicated by atime or ctime.

(Improvement Plan 2) File path names are not added to the partial accessed file lists 301 in response to file read requests and file write requests. Instead, when a file creation request is made, the path name is registered to the latest partial accessed file list 301 at that time. After that, when performing the processing shown in FIG. 9, the path name is added to what is registered in the partial accessed file list 301 as the result of referring to ctime 712 and atime 713 of the meta-information 710 in Step 904; and the path name of a file whose file data is determined not to be migrated is added to the partial accessed file list 301 for the second latest period. Alternatively, the path name of the file which is determined not to be migrated is added to the partial accessed file list 301 for the time period including the time of ctime 712 and atime 713 of that file.

Note that the path name of a file may sometimes be changed and any of the countermeasures described below may be taken.

(Countermeasure 1) Instead of the path name registered in the partial accessed file list 301, an identifier which will not change even if the path name is changed is registered. An example of such an identifier is the identifier assigned to the meta-information 710.

(Countermeasure 2) The file which is lost due to the change of the path name is treated as if it has been deleted. If this countermeasure is used together with the above-mentioned improvement plan 2, it is necessary to register the changed path name to the partial accessed file list 301 when receiving a request for changing the path name.

(Countermeasure 3) The original path name before the change, which is recorded in the partial accessed file list 301, is updated to the changed path name.

Note that the partial accessed file list 301 may be used, other than its use in file migration based on the migration threshold time period, in order to identify a file which has received a request for updating ctime 712 and atime 713 from the time earlier than the current time by the length of the threshold time period to new time. This type of processing can be implemented by the client 104 or the file server 101 by comparing the time period for the partial accessed file list 301 with the threshold time period, and is suitable for index creation and virus check based on the file data.

Incidentally, if an unused region of the high-performance storage region is not sufficient, files may be extracted from the partial accessed file list 301 for the oldest time period (the list created based on ctime 712 is especially suitable) and the file data may be migrated from the high-performance storage region to the low-performance storage region.

If the size of the partial accessed file list 301 exceeds a list size threshold set to the file server 101 by the administrator for the file server 101, the following processing may be executed.

Regardless of the policy, a file whose path name is recorded in the partial accessed file list 301 for the oldest time period is migrated and deleted. In this case, the file server 101 may transmit an error message and the path name of the migrated file to the management console 105 in order to make the management console 105 display that the list size of the relevant file has exceeded the list size threshold and the file has been migrated.

The partial accessed file list 301 for the oldest time period is deleted. Subsequently, the file crawling program 213 is executed. In this case the file server 101 may transmit an error message to the management console 105 in order to make the management console 105 to display that the relevant file has been migrated.

Second Embodiment

Next, the second embodiment of this invention is described with reference to FIG. 18. The difference between the first embodiment and the second embodiment is that the file server 101 accesses the storage subsystem 103 via a file server 18101. Note that the file server 18101 has the same type of hardware configuration as that of the file server 101 and the same type of operating system as the operating system 230 (however, they do not have to be completely the same) is stored in the memory of the file server 18101 (however, event notice is not mandatory).

As an example of configuring a file service system with a plurality of file servers 101, the file server 101 executes the processing for realizing high-performance file access processing, while the file server 18101 realizes additional functions such as high reliability and WORM; and this embodiment may be adopted when both of the above-described functional characteristics are to be provided by the file service system.

Figure 18:
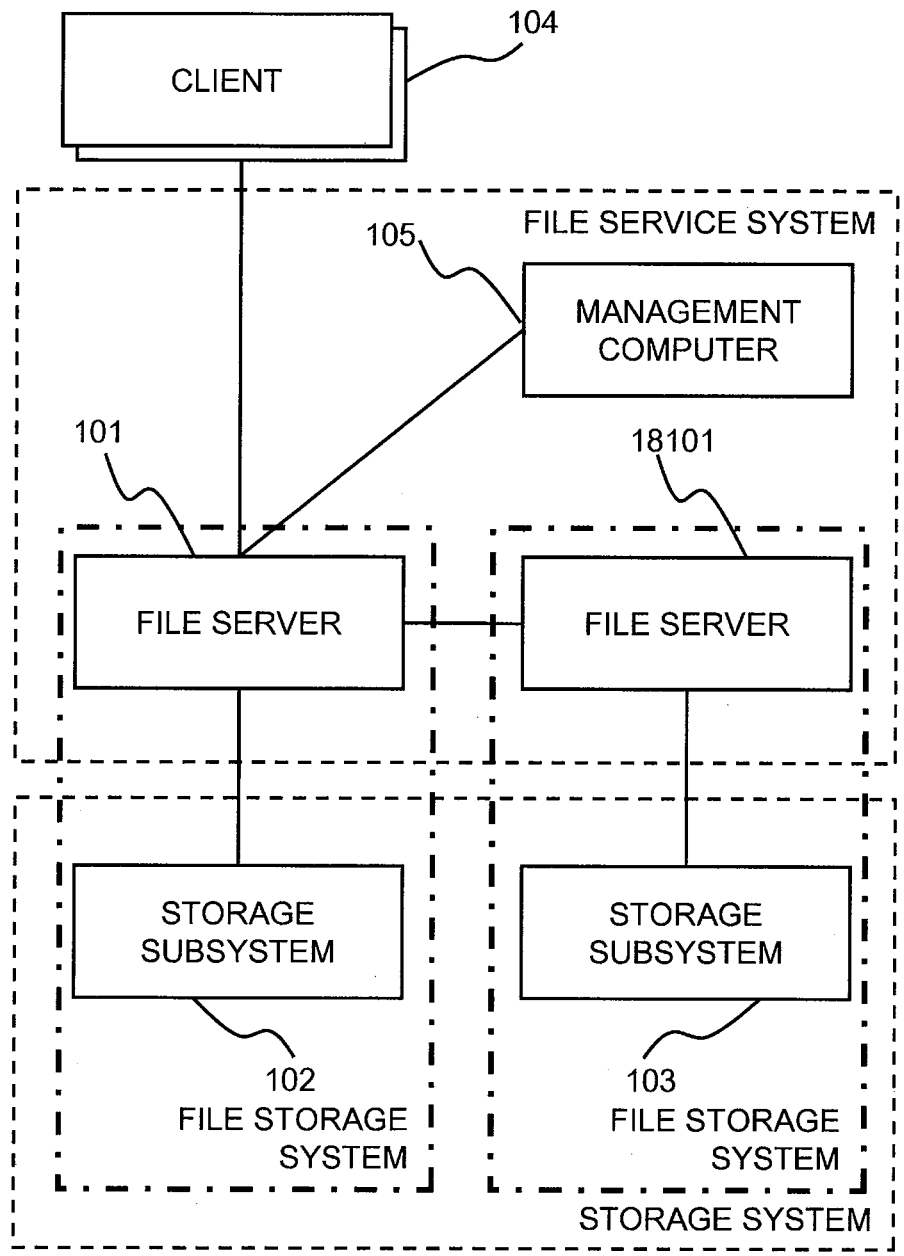
[FIG. 18]

Note that a file server and a storage subsystem may be sometimes collectively referred to as a "file storage system." In the example shown in FIG. 18, the file server 101 and the storage subsystem 102 constitute a file storage system, and the file server 18101 and the storage subsystem 103 also constitute a file storage system. Incidentally, when they are treated as a file storage system, the file server may also include the storage subsystem.

The processing executed by the file server 101 in the second embodiment is implemented, not by transmitting a block-level request to access the storage subsystem 103, but by transmitting a file-level request to the file server 18101. In other words, the file data stored in the low-speed storage region is created as a file in the file server 18101 and is stored in the storage region of the storage subsystem 103. Note that the file server 18101 receives a request from the file server 101 according to NFS or CIFS as the network file system protocol, and transmits a block-level access request to the storage subsystem 103. However, a request may be exchanged between the file server 101 and the file server 18101 according to network protocols other than NFS or CIFS.

Note that, in case of the second embodiment, the information about the file data regarding the storage region as indicated by the meta-information directly or indirectly shows the path name of the file created by the file server 18101.

Industrial Applicability

This invention can be applied to the file service system for storing files using storage regions of different characteristics.

Reference Signs List

101, 18101 File server
102, 103 Storage subsystem
104 Client computer
201 CPU
204 Memory

The invention claimed is:

1. A computer system comprising:
a client computer;
a storage system for providing a first storage region and a second storage region; and
a file service system coupled to the client computer and the storage system;
wherein the performance of the first storage region is higher than that of the second storage region;
wherein the file service system manages accessed file information including a plurality of partial accessed file lists, in which the files in each of the partial accessed file lists have been accessed by the client computer within the period of time specified for the corresponding partial accessed file list, and stores files, each including file meta-information and file data in the first storage region;
wherein each of the file meta-information indicates a last accessed time by the client computer of the relevant file data;
wherein the file service system selects at least one of the partial accessed file lists that satisfies migration policy information, and selects a candidate file from the files indicated in the selected at least one partial accessed file list based on the last accessed times indicated by the file meta-information; and
wherein the file service system migrates the candidate file from the first storage region to the second storage region.

2. The computer system according to claim 1,
wherein the migration policy information includes a migration threshold time period which is a condition for the last accessed time about each of the stored files to remain in the first storage region;
wherein the file service system selects the at least one partial accessed file list which corresponds to a period before the migration threshold time period; and
the file service system selects a candidate file from the files indicated in the selected at least one partial accessed file list that has a last access time which corresponds to a period before the migration threshold time period.

3. The computer system according to claim 2,
wherein the file service system sends the last accessed time in response to a request to acquire the last accessed time, and
wherein the file service system updates the last accessed time in the file meta-information in response to a request to access the file data.

4. The computer system according to claim 3,
wherein one of types of the access of the files is a creation of the stored files or an update of the stored files.

5. The computer system according to claim 4,
wherein one of types of the access of the files is reading of the stored files.

6. The computer system according to claim 1,
wherein each period of time specified for each of the partial accessed file lists is one of a plurality of consecutive time periods set by dividing an elapsed time until a current time.

7. The computer system according to claim 1,
wherein the migration policy information further includes at least one of information specifying an extension of files or a size of file data, and
wherein the file service system selects the candidate file further based on at least the extension of files or the size of file data.

8. The computer system according to claim 1,
wherein the file service system migrates the candidate file at a predetermined timing.

9. A method for providing a file service by a file service system coupled to a storage system for providing a first storage region and a second storage region, the first storage region exhibiting higher performance than that of the second storage region, the method comprising:

managing accessed file identifier information including a plurality of partial accessed file lists, in which the files in each of the partial accessed file lists have been accessed by the client computer within the period of time specified for the corresponding partial accessed file list;

storing files, each including file meta-information and file data in the first storage region, where each of the file meta-information indicates a last accessed time by the client computer of the relevant file data;

selecting at least one of the partial accessed file lists that satisfies migration policy information, and selecting a candidate file from the files indicated in the selected at least one partial accessed file list based on the last accessed times indicated by the file meta-information; and migrating the candidate file from the first storage region to the second storage region.

10. The method according to claim 9, wherein the migration policy information includes a migration threshold time period which is a condition for the last accessed time about each of the stored files to remain in the first storage region;

wherein, the file service system selects the at least one partial accessed file list which corresponds to a period which is before the migration threshold time period; and the file service system selects a candidate file from the files indicated in the selected at least one partial accessed file list that has a last access time which corresponds to a period before the migration threshold time period.

11. The method according to claim 10, further comprising:

sending a last accessed time in response to a request to acquire the last accessed time; and updating the last accessed time in the file meta-information in response to a request to access the file data.

12. The method according to claim 9, wherein each period of time specified for each of the partial accessed file lists is one of a plurality of consecutive time periods set by dividing an elapsed time until a current time.

13. The method according to claim 9, wherein the migration policy information further includes at least one of information specifying an extension of files or a size of file data, and wherein the file service system selects the candidate file further based on at least the extension of files or the size of file data.

14. The method according to claim 9, wherein the file service system migrates the candidate file at a predetermined timing.

15. A file service system comprising:

an interface coupled to a client computer and a storage system for providing a first storage region and a second storage region;

a processor coupled to the interface; and a memory coupled to the processor, for storing accessed file information including a plurality of partial accessed file lists, in which the files in each of the partial accessed file lists have been accessed by the client computer within the period of time specified for the corresponding partial accessed file list;

wherein the performance of the first storage region is higher than that of the second storage region;

wherein the processor stores files, each including file meta-information and file data in the first storage region via the interface;

wherein each of the file meta-information indicates a last accessed time by the client computer of the relevant file data;

wherein the processor selects at least one of the partial accessed file lists that satisfies migration policy information, and selects a candidate file from the files indicated in the selected at least one partial accessed file list based on the last accessed times indicated by the file meta-information; and wherein the processor migrates the candidate file from the first storage region to the second storage region.

16. The file service system according to claim 15, wherein the migration policy information includes a migration threshold time period which is a condition for the last accessed time about each of the stored files to remain in the first storage region;

wherein the processor selects the at least one partial accessed file list which corresponds to a period before the migration threshold time period; and the file service system selects a candidate file from the files indicated in the selected at least one partial accessed file list that has a last access time which corresponds to a period before the migration threshold time period.

* * * * *